Nov. 11, 1969    J. W. WILLIAMS ET AL    3,477,745
QUICK CONNECTION OF PIPE TO DUCTING
Filed March 11, 1968    2 Sheets-Sheet 1
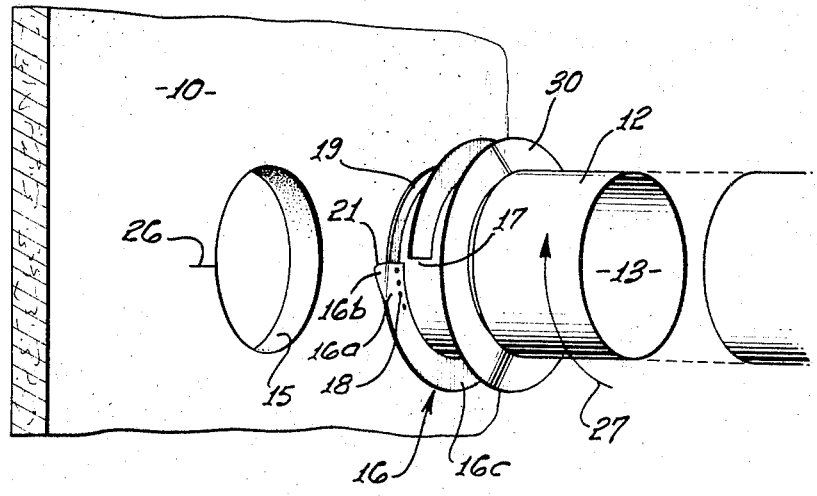
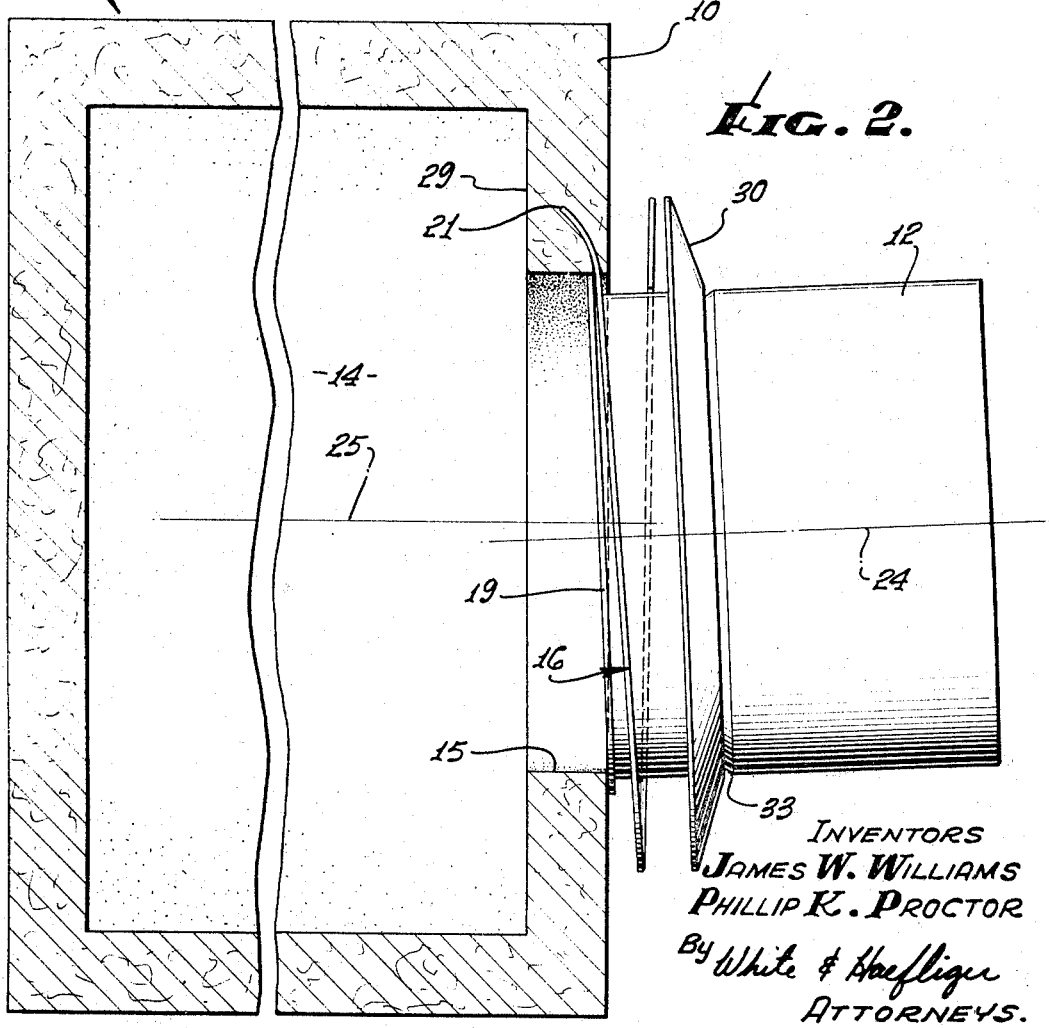
INVENTORS
JAMES W. WILLIAMS
PHILLIP K. PROCTOR
BY White & Haefliger
ATTORNEYS.

Nov. 11, 1969  J. W. WILLIAMS ET AL  3,477,745
QUICK CONNECTION OF PIPE TO DUCTING

Filed March 11, 1968  2 Sheets-Sheet 2

INVENTORS.
JAMES W. WILLIAMS
PHILLIP K. PROCTOR
By White & Haefliger
ATTORNEYS.

United States Patent Office 3,477,745
Patented Nov. 11, 1969

3,477,745
QUICK CONNECTION OF PIPE TO DUCTING
James W. Williams, Los Angeles, and Phillip K. Proctor, Anaheim, Calif., assignors to Allied Insulation Company, doing business as Permanent Pipe Products Co., Huntington Beach, Calif., a corporation of California
Filed Mar. 11, 1968, Ser. No. 712,222
Int. Cl. F16l 15/00, 21/00
U.S. Cl. 285—40
6 Claims

ABSTRACT OF THE DISCLOSURE

The disclosure concerns rapid connection and sealing of take-off pipe to a duct panel that may be effected simply and rapidly in response to advancement of the pipe end toward the panel accompanied by rotation of the pipe. The rapid connection is formed by a cutter mounted on the pipe which cuts through the panel as the pipe is rotated. A helical retainer member having one end free of the pipe follows the cutter through the panel to the opposite side thereby preventing withdrawal of the pipe from the panel.

Background of the invention

This invention relates generally to ducting as used in heating and ventilation applications, and more particularly concerns making round take-off connections to fibrous (as for example fiberglass) ducts.

In the past, the installation of take-off connections to rectangular fiberglass duct board systems has been excessively time consuming and expensive. For example, the installation typically requires hand fitting and attaching of the pipe to the duct panel or wall, using such items as screws, bolts, washers and pins, and requiring taping and sealing. To my knowledge, no way was known to speed up the making of such connections in the easy, rapid and convenient manner as now afforded by the present invention, to eliminate need for screws, bolts, washers and pins, as well as taping and sealing.

Summary of the invention

Basically, the invention has as its major object the provision of a rapid connection of take-off pipe to a duct panel that may be effected quite simply and rapidly in response to advancement of the pipe end toward the panel accompanied by rotation of the pipe. The method may be considered to involve the steps of cutting an opening through a duct panel of a size to closely receive the pipe end; slicing the panel along a rotary path extending about the opening; advancing the forward terminal of the pipe in the panel opening; and rotating the pipe to feed along the defined path a retainer supported on the pipe to project outwardly for reception in the slice, pipe endwise movement in the opening being controlled to effect relative movement between the retainer and pipe. Preferably, pipe movement is continued to advance the retainer through the panel so as to extend at the duct interior side of the panel, the latter then being retained between the retainer and a backer on the pipe at the outer side of the panel, as will be seen.

In its apparatus aspects, the invention basically comprises, in combination with a pipe to be connected to a sliceable panel, a cutter carried by the pipe to project sidewardly therefrom with presentation for slicing the panel along a generally rotary and advancing path as the pipe is rotated relative to and advanced endwise relatively toward the panel; and a retainer carried by the pipe to extend about the pipe axis and sized for feeding along that rotary path in response to pipe rotation, the retainer having a substantial portion that is freely floating relative to the pipe during such feeding. Such rotation may typically cause the cutter and retainer to penetrate through the panel, the capacity for free floating bringing the retainer into adjacency with the side duct interior side of the panel, as will be seen. Further, a backer is typically located on the pipe to engage the outer side of the panel in such manner that the panel is snugly retained between the retainer and backer, for assuring a substantially air-tight pipe supporting connection, all of which may be accomplished surprisingly swiftly and easily merely by rotating and advancing the pipe within an opening formed in the panel.

Additional objects of the invention include the provision of a retainer in the form of a split ring; the provision of a shoulder such as a lip on the pipe located to confine the floating portion of the retainer against displacement beyond predetermined extent relative to the backer so that the panel may be snugly confined between the retainer and backer; the provision of the backer in the form of a generally frusto-conical annulus tapering relatively rearwardly and inwardly, the backer annulus being resiliently deformable when urged against the panel thereby to form a gas seal with the panel; and the provision of a duct incorporating the panel as a flat wall of the duct.

These and other objects and advantages of the invention, as well as the details of an illustrative embodiment, will be more fully understood from the following detailed description of the drawings, in which:

Brief description of drawings

FIG. 1 is a perspective showing of a pipe and associated structure incorporating the invention, and in relation to a panel;

FIG. 2 is an enlarged elevation, taken in section, illustrating a step in the method of connecting the FIG. 1 pipe to the panel;

Description of preferred embodiment

Figure 3:
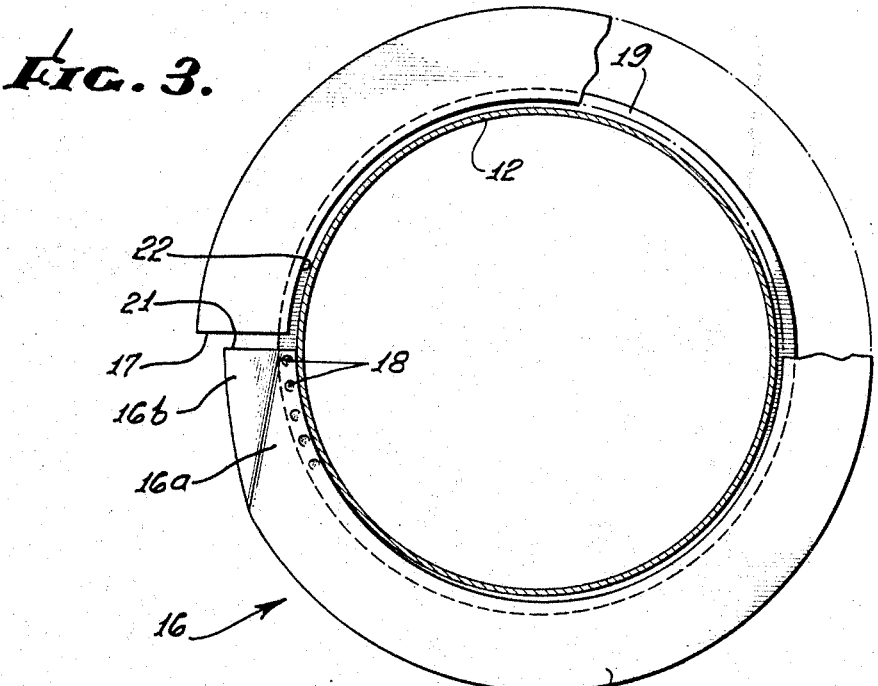
FIG. 3 is an end view of a pipe and associated retainer structure, taken in section, to show details of construction of the FIG. 1 form of the invention.
Figure 4:
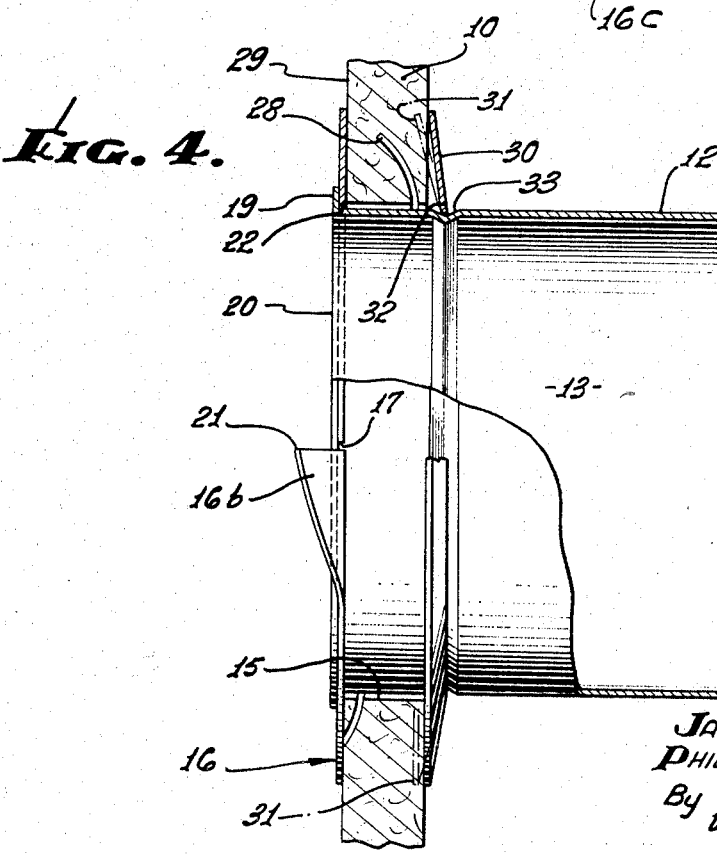
FIG. 4 is a view like FIG. 2, but showing the pipe completely connected to the panel, which comprises a duct wall.

In the drawings a sliceable panel 10 may define a flat wall of an air or other gas duct 11, as seen in FIG. 4. Typically, but not necessarily the sliceable panel may consist of a fiberglass duct board, and the ducting may be rectangular in cross section. A pipe 12 is to be connected to the sliceable panel 10 so as to communicate the pipe interior 13 through the panel, and typically with the interior 14 of the duct, forming a take-off connection. For this purpose, a hole 15 is first cut in the panel to be of a size to closely receive the circular cross section pipe, as appears more clearly in FIG. 4. The pipe itself may typically be made of various gauges of galvanized metal, although this is by way of example only.

In accordance with the invention, a cutter is provided to be carried by the pipe to project sidewardly relative to the pipe with presentation for slicing the panel along a generally rotary and advancing path as the pipe is rotated relative to and advanced endwise relatively toward the panel. Further, a retainer is carried by the pipe to extend about the pipe axis and sized for feeding along the rotary path in response to pipe rotation, the retainer having a portion of substantial extent that is free to float relative to and along the pipe during such feeding.

In the illustrated example, the retainer comprises ring 16 split at 17 and carried by the pipe as by welding or other attachment at 18 of the ring inner end portion 16a to an annular lip or flange 19 projecting outwardly at the pipe terminal 20. The cutter may be formed integrally with the split ring, and in such instance is indicated at 21 at the edge of a forwardly inclined portion 16b of the ring located outwardly of the connection 18, whereby the cutter may be considered as integral with the pipe. The retainer ring 16 on the other hand, has a portion 16c of substantial annular extent outwardly spaced at 22 from the pipe to float endwise relative thereto, and typically portion 16c may include all of the retainer ring other than the portion 16a connected to the pipe flange 19.

In connecting the pipe to the panel, the pipe terminal 19 may be inserted into the opening or hole 15, with slight inclination of the pipe axis 24 relative to the hole axis 25 as seen in FIG. 2, in order to allow partial insertion of the lip 19. Further, the cutter 21 is aligned with and inserted into a starter cut 26 preliminarily formed in the panel 10, as for example is seen in FIG. 1. In this regard, the diameter of the hole may be about the same or slightly less than the diameter of the lip 19, since the ultimate clearance between the hole and fully connected pipe should not be excessive in order to preclude lateral looseness of the pipe in the panel.

Following such advancement or insertion, the pipe is rotated as in the direction of arrow 27 in FIG. 1 to "twist-connect" the pipe to the panel, locking also being achieved. In this regard, the cutter slices the panel interior (as seen at 28 in FIG. 4) and the lead of the cutter in engagement with the panel creates a corkscrew effect advancing or pulling the pipe into fully connected position, as seen in FIG. 4, the lip 19 being forcibly pulled through the hole. Such slicing is along a rotary path about the axis 25, and the split ring 16 feeds along that rotary path, in response to pipe rotation, whereby the cutter and ring may be caused to progressively emerge from the inner side 29 of the panel, bringing the ring adjacent the panel inner side. The compressive quality of the fiberglass panel allows retainer advancement without binding.

It will be noted that the lip 19 defines a shoulder located to confine the floating portion of the ring so as ultimately to extend annularly about the pipe and in a plane normal to axis 25, for sealing engagement with the inner side 29 of the pipe. It may thus be considered that endwise movement of the pipe is controlled to effect relative movement between the retainer ring and pipe, as for example to bring the ring into the position seen in FIG. 4, such relative movement being afforded by the endwise floating relationship of the ring portion 16c relative to the pipe.

Another aspect of the invention concerns the provision of a backer carried on the pipe to engage the panel rearwardly of the retainer ring 16, in such manner that the panel is confined between the retainer and backer. In the illustrated form of the invention, the backer comprises a generally frustoconical annulus 30 tapering rearwardly and inwardly, the backer annulus being resiliently deformable when urged against the panel for exerting force on the pipe tending to cause the lip 19 to hold the retainer ring 16 in sealing engagement with the panel inside 29. In this way the panel becomes snugly confined between the backer 30 and ring 16. Note also that the lip 19 then annularly engages the ring 16 to form a seal therebetween, whereby the take-off connection of the pipe to the ducting is made gas tight. Broken line 31 indicates the undeformed condition of the backer 30. The inner periphery 32 of the backer may be retained in an annular recess 33 formed in the pipe, as shown.

In summary, the method of connecting the pipe to the duct includes the steps of cutting an opening through the panel 10 of a size to closely receive the pipe; slicing the panel along a rotary path extending about the opening and through the panel to receive the retainer; advancing the forward terminal of the pipe in the opening; and rotating the pipe to feed the retainer along the sliced path as well as controlling endwise movement of the pipe to effect relative movement between the retainer and pipe. Typically, the rotation is continued until the retainer has completely emerged from the panel for sealing engagement with the panel side from which the retainer emerges.

Finally, the retainer and backer may be made of thin sheet metal, as may the pipe.

We claim:
1. In combination with a pipe to be connected to a sliceable panel to communicate the pipe interior through the panel,
  a cutter carried by the pipe to project generally radially outwardly therefrom with presentation for slicing the panel along a generally rotary and advancing path as the pipe is rotated relative to and advanced endwise relatively toward the panel,
  a retainer carried by the pipe to extend about the pipe axis and sized for feeding along said rotary path in response to pipe rotation, the retainer having a portion of substantial extent that is free to float relative to and along the pipe during said feeding, said retainer comprising a thin sheet that spirals about the pipe to feed along said path through the panel in response to pipe rotation causing said cutter to penetrate through the panel and bringing said retainer adjacent the panel at the penetrated side thereof, the cutter projecting forwardly relative to the retainer and being in general rotary alignment with the forwardmost extent of the retainer,
  a backer carried on the pipe to engage the panel rearwardly of the retainer so that the panel is confined between the retainer and backer, and
  a shoulder on the pipe adjacent the cutter to limit said floating of said retainer portion, said cutter, backer, shoulder and forwardmost extent of the retainer fixed to the pipe against relative movement thereto.

2. In combination with a pipe to be connected to a sliceable panel to communicate the pipe interior through the panel,
  a cutter carried by the pipe projecting generally radially outwardly therefrom with a cutting surface extending substantially from the outer wall of said pipe to the radially outermost extent of said cutter for slicing the panel along a generally rotary and advancing path as the pipe is rotated relative to and advanced endwise relatively toward the panel,
  a retainer carried by the pipe extending helically about the pipe axis and sized for feeding along said rotary path in response to pipe rotation, said retainer having one end connected to said cutter against relative movement thereto and the remainder of the retainer including a portion of substantial extent characterized as free to float relative to and along the pipe during said feeding, said retainer comprising a split ring sized to feed along said path through the panel in response to pipe rotation causing said cutter to penetrate through the panel and bringing said ring adjacent the panel at the penetrated side thereof, the cutter projecting forwardly relative to the retainer,
  a backer carried on the pipe to engage the panel rearwardly of the retainer so that the panel is confined between the retainer and backer, and
  a shoulder on the pipe located adjacent said cutter to confine the floating portion of the retainer against displacement beyond predetermined extent relative to the backer so that the panel may be snugly confined between the retainer and backer, said cutter, backer and shoulder fixed to the pipe against relative movement thereto.

3. The combination of claim 2 wherein the backer comprises a generally frusto-conical annulus tapering relatively rearwardly and inwardly, the backer annulus being resiliently deformable when urged against the panel, for exerting force on the pipe tending to cause said shoulder to hold the retainer in sealing engagement with the panel.

4. The combination of claim 2 including a duct incorporating said panel as a flat wall engaged at opposite sides thereof by said retainer and backer.

5. The combination of claim 1 wherein the backer comprises a frusto-conical ring tapering relatively rearwardly and inwardly, the backer being resiliently deformable to firmly engage the panel for forming an air seal therewith in response to said pipe rotation feeding the retainer through the panel.

6. The combination of claim 5 including a duct incorporating said panel as a duct wall through which said pipe projects.

References Cited

UNITED STATES PATENTS

| 1,648,855 | 11/1927 | Lytton | 85—27 |
| 2,201,930 | 5/1940 | Stark | 85—32 X |
| 2,346,051 | 4/1944 | Seamark | 285—369 |
| 2,461,863 | 2/1949 | Zeeb | 285—390 |
| 3,151,893 | 10/1964 | Lyon | 285—158 |
| 3,152,817 | 10/1964 | Watson et al. | 285—424 X |

FOREIGN PATENTS

| 1,398,926 | 4/1965 | France. |
| 1,402,079 | 5/1965 | France. |
| 956,108 | 12/1957 | Germany. |
| 408,608 | 4/1934 | Great Britain. |

DAVID J. WILLIAMOWSKY, Primary Examiner

DAVE W. AROLA, Assistant Examiner

U.S. Cl. X.R.

30—276, 347; 85—46; 285—189, 390

Disclaimer 3,477,745.—*James W. Williams*, Los Angeles, and *Phillip K. Proctor*, Anaheim, Calif. QUICK CONNECTION OF PIPE TO DUCTING. Patent dated Nov. 11, 1969. Disclaimer filed Nov. 29, 1982, by the assignee, *Allied Insulation Co. doing business as Permanent Pipe Products Co.*

Hereby enters this disclaimer to claims 1, 5 and 6 of said patent.

[*Official Gazette February 8, 1983.*]